United States Patent
Isaacson et al.

(10) Patent No.: US 10,387,414 B2
(45) Date of Patent: Aug. 20, 2019

(54) HIGH PERFORMANCE BIG DATA COMPUTING SYSTEM AND PLATFORM

(71) Applicant: Risk Management Solutions, Inc., Newark, CA (US)

(72) Inventors: Cory Isaacson, Broomfield, CO (US); David Glaubman, Woodside, CA (US); Dan Lynn, Littleton, CO (US); Christof Bornhoevd, Belmont, CA (US); Ian McCormick, Riverside, CA (US)

(73) Assignee: Risk Management Solutions, Inc., Newark, CA (US)

( * ) Notice: Subject to any disclaimer, the term of this patent is extended or adjusted under 35 U.S.C. 154(b) by 261 days.

(21) Appl. No.: 15/097,233

(22) Filed: Apr. 12, 2016

(65) Prior Publication Data

US 2016/0299944 A1 Oct. 13, 2016

Related U.S. Application Data

(60) Provisional application No. 62/146,836, filed on Apr. 13, 2015.

(51) Int. Cl.
*G06F 16/22* (2019.01)
*G06F 16/28* (2019.01)
(Continued)

(52) U.S. Cl.
CPC ........ *G06F 16/2453* (2019.01); *G06F 16/221* (2019.01); *G06F 16/2237* (2019.01);
(Continued)

(58) Field of Classification Search
CPC ............. G06F 16/2453; G06F 16/2237; G06F 16/24542; G06F 16/2455; G06F 16/221; G06F 16/24534; G06F 16/283
See application file for complete search history.

(56) References Cited

U.S. PATENT DOCUMENTS 7,315,849 B2 * 1/2008 Bakalash .......... G06F 17/30457
2005/0262108 A1 11/2005 Gupta
(Continued)

FOREIGN PATENT DOCUMENTS

WO WO 2015/153290 A1 10/2015

OTHER PUBLICATIONS

PCT International Search Report and Written Opinion, PCT Application No. PCT/US16/27162, dated Jul. 18, 2016, 12 pages.
(Continued)

*Primary Examiner* — James Trujillo
*Assistant Examiner* — Kurt A Mueller
(74) *Attorney, Agent, or Firm* — Hickman Palermo Becker Bingham LLP

(57) ABSTRACT

A computing system and platform uses various types of data stores to allow efficient querying of, and accelerated access to, extremely large data sets. One such data store is a dimension store that combines key-value and columnar stores, access to which is provided by several selectable mechanisms chosen based the nature of the data of interest. These include bitmap-based access, us of an optimized columnar data format, and access via namespace identifiers. A compressed, optimized page data format is provided for storing and analyzing large fact-based data. The complex dimension store is used to provide complex relationships and interpretation of the fact-based data, enabling high-performance advanced queries, with bitmap indexes passed between the two stores. Dimension data is stored in an encrypted manner throughout the system, and can be exchanged among parties in a secure manner.

20 Claims, 14 Drawing Sheets

(51) Int. Cl.
*G06F 16/2453* (2019.01)
*G06F 16/2455* (2019.01)

(52) U.S. Cl.
CPC .... *G06F 16/2455* (2019.01); *G06F 16/24542* (2019.01); *G06F 16/283* (2019.01)

(56) References Cited

U.S. PATENT DOCUMENTS

| | | |
|---|---|---|
| 2008/0270363 A1 | 10/2008 | Hunt et al. |
| 2008/0288538 A1* | 11/2008 | Hunt ................ G06F 17/30592 |
| 2010/0119166 A1 | 5/2010 | Puetter |
| 2013/0275612 A1 | 10/2013 | Voss et al. |
| 2013/0332474 A1 | 12/2013 | Glaubman et al. |
| 2014/0278306 A1 | 9/2014 | Taghavi et al. |
| 2014/0280193 A1* | 9/2014 | Cronin .............. G06F 17/30539 |
| | | 707/741 |
| 2015/0220584 A1 | 8/2015 | Isaacson et al. |
| 2016/0103914 A1* | 4/2016 | Im .......................... H04L 63/20 |
| | | 707/770 |

OTHER PUBLICATIONS

U.S. Appl. No. 61/988,861, filed May 5, 2014, Inventors Cory M. Isaacson et al.

* cited by examiner

| periodNumber 4 bytes | eventId 4 bytes | eventOccurrence DateOffset 2 bytes | itemId 8 bytes | value 4 bytes |

*FIG. 6*

Namespaces (802) (801)

| AcmeManufacturing | 1 |

00000000000000000000000000000001 (803)

| GutsyInsurance | 3 |

00000000000000000000000000000011 itemIds and result values

| 1 | .0056 |

00000000000000000000000000000001 (805)

| 5 | .0037 |

00000000000000000000000000000101 itemId key value

| 1 | .0056 |

0000000000000000000000000000000110000000000000000000000000000001 (804)

| 5 | .0037 |

HIGH PERFORMANCE BIG DATA COMPUTING SYSTEM AND PLATFORM

CROSS REFERENCE TO RELATED APPLICATIONS

This application claims the benefit of U.S. Provisional Application No. 62/146,836 filed on Apr. 13, 2015, which is incorporated by reference in its entirety.

FIELD

The subject matter described herein relates generally to data processing systems for management of massive amounts of data, and more specifically to systems for quickly accessing and analyzing data from various sources in disparate formats.

BACKGROUND

A data explosion has taken place over the past few decades. In almost every industry and field of endeavor, data and metadata have been generated, organized and stored to a degree never before seen. Satellite images are now publicly available from multiple sources for the entire globe. Weather and climatological data are likewise available on a worldwide basis. Other information, such as population density and demographics, electrical grid capacities, water resources, geopolitical records and the like is available via both free and paid services, whether from the public sector or the private sector.

While the availability of such data permits creation of services and systems never before possible, it also poses a tremendous technical challenge. With so much available data, analysis is now often limited by the ability of computing systems to quickly access to and process such data from any desired location. This is particularly true where there is an interest in using data from a variety of sources for a variety of applications. Each data source may be organized in its own way, coded uniquely and accessible in a manner different from other sources. Each application may be expecting to get information in a particular way that may well not match with data sources that might be useful for the application.

To provide just one example, consider the data that may be available regarding a particular piece of real property, such as a suburban shopping center. Municipal data identifying the property based on its tax parcel identifier and perhaps on corresponding utility counts may be available. Street addresses for the businesses in the shopping center are also available and those are typically geocoded for various cartographic uses. The property is also likewise identified by its geographical coordinates, what zoning district it lies in, whether it is inside or outside a particular flood zone boundary, its distance from utilities such as fiber optic distribution facilities, and the like. Each of these items of data is provided in a form determined for its typical use, for instance tax maps are designed for use in administering municipal tax systems while flood maps are designed for use in federal emergency planning. And notably, some types of properties are not well identified using approaches that work well for other types of properties. For example, while it makes sense to provide an address of a commercial building, such an approach cannot be used very well for a rail facility that measures only tens of feet in one dimension but hundreds of miles in another dimension. Likewise, utility transmission lines, gas and oil pipelines and such are continuously distributed throughout their geographic range, and in any event often do not have conventional physical addresses corresponding to the locations of their component parts. Thus, in many instances there is no particular compatibility or correlation among numerous data sources that all characterize a particular piece of real property or other type of asset.

Numerous attempts have been made to address such challenges. For example, relational databases provide a level of flexibility that has made them quite popular, but sometimes suffer from performance bottlenecks. Columnar database systems have enhanced performance but do not always lend themselves to common system requirements (where data is typically row-based) and thus often require ancillary processing to make them most helpful. In-memory database systems can improve on performance compared to both relational and columnar databases, but are costly to implement when used for large data sets. Data grid architectures have also been developed over the past two decades or so to handle extremely large data sets, such as those used in particle physics research (e.g., at CERN in Switzerland) and in climate modeling. While such data grids scale extremely well without performance losses seen in older architectures, to date they lack flexibility in managing widely disparate types of data without significant preprocessing.

In one application, the field of probabilistic modeling can involve simulation of various simulation periods, events or scenarios against a given set of items to be affected by the events, generating a series of potential outcomes for each event. Such models can be probability based (i.e., generating a probability factor of the likelihood of each event's effects on a given item) or period-based (i.e., generating a set of simulated time periods, each containing a series of events and a likelihood of their impacts within a given event period simulation). Further discussion of related issues is provided in copending, commonly owned U.S. patent application Ser. No. 13/799,120 filed Mar. 13, 2013, published as US 2014/0278306, the contents of which is hereby incorporated by reference as if fully set forth herein. Such modeling can be applied to various fields and industry sectors, including agriculture (risks to farmland and agricultural products); supply chain (possible interruptions impacting certain vendors or procurement items); insurance (relating for instance to real property, people, or contents of buildings/containers); protection of governmental/municipal facilities (airports against weather or terrorism, dams and other flood defenses against storm water), energy (oil platforms, tankers and pipelines subject to leaks/spills); healthcare (ranging from disease prediction to analysis of possible pandemic/epidemic threats to personalized medicine procedure outcome prediction); and heavy industry (factory disruption based on events ranging from work stoppages to worker health to catastrophic events).

For each of these scenarios, probabilistic modeling provides a mechanism to generate large series of potential outcomes. The corresponding data generated is very large, with potentially billions or trillions of results from a single model run. The potential data sizes for such operations can be readily understood by considering that data cardinality in such situations may be driven by the product of the number of items of interest, the number of simulation periods, the number of events per period, and the average item hit rate per item.

Such processing as typically been performed in a "map/reduce" manner. In many types of processing, the task is to process a large amount of input data and reduce it to a small number of "answers" (often only one). With probabilistic modeling, however, the output size is not typically reduced, since the model outputs are intended to be thereafter available for further analysis to address a wide range of questions that may be posed by those interested in one particular aspect of the larger field being modeled.

Still further, in many applications various items being considered may themselves carry their own sets of attributes. For example, a machine or other heavy asset may have its own metadata regarding its age, time until next service and the like; a facility may likewise have attributes or constraints (an airport may be subject to a noise curfew of 11 p.m. local time for outbound flights and midnight for inbound flights). Thus, metadata for items considered, in order to be available for future analysis, adds complexity to such modeling. Data structures for an item may be expressed as a nested hierarchy of a large number of attributes that may make use of a traditional relational database structure difficult or nearly impossible to use. Further discussion of such complexity is provided, for example, in copending commonly owned U.S. patent application Ser. No. 13/914,774, filed Jun. 11, 2013 and published as US 2013/0332474 and PCT application PCT/US2015-022776, filed Mar. 26, 2015, the contents of which are hereby incorporated by reference as if fully set forth herein The resulting data analysis challenges include, for example, items that are characterized along hundreds if not thousands of dimensions, many of which are nested or otherwise arranged in non-trivial relationships; such information, referred herein as dimension data, is used as both the subject of the model, as well as providing meaning and interpretation to the post-processing output for probabilistic models. It may not always be beneficial to simplify this robustly characterized information because future processing may call upon the various relationships in manners not known in advance. Further, each specific probabilistic model typically requires specialized information to perform its simulations. Simulating a railroad line vs. a catastrophe that could affect municipal infrastructure would be highly differentiated models, each requiring specialized input data about the items under simulation. Therefore, in addition to the input data size being extremely large, the output data size of interest may remain large, on the terabyte-scale for even a single modeling exercise. In addition to the data size, the types of calculations on the data for such modeling are often not simple, but can include many complex non-additive metrics. The combination of data structure, data size, and processing type issues makes it quite difficult to contemplate use of conventional computing architectures for such processing.

Conventional model computation constructs a given model as a single large function and is known as "monolithic model implementation." Typically, this is implemented using a primary programmatic loop over repeating elements, represented in pseudo-code as:

---
for each Event
   for each Item
      model simulation computation
---

This approach is referred to as event/item loop processing. For each iteration of the loop, the model simulation needs to be computed, which can quickly result in data and computational "explosions" as the number of events and items increases. The model itself can be scaled across multiple computational devices, however the complex nature of the dimension data, with its inherent data relationships, makes scaling this type of information very difficult. Some attempts have been made to use columnar databases in such applications, but these have their own scaling issues and columnar databases are typically not well-suited for supporting complex object types.

Rather than using computing systems with typical, known architectures, is would be desirable if a computing system with an architecture that optimizes processing of such large, complex and disparate data sets, through a wide variety of applications, were available.

The features and advantages described in the specification are not all inclusive and, in particular, many additional features and advantages will be apparent to one of ordinary skill in the art in view of the drawings and text herein. Moreover, it should be noted that the language used in the text has been principally selected for readability and instructional purposes, and may not have been selected to delineate or circumscribe the disclosed subject matter.

SUMMARY

The embodiments described herein provide systems and methods for big data processing. In one aspect based on the illustrative example of FIG. 1, a computing system (100) includes a model processor (132) and an analytics processor (133). The model processor (132) accesses data stored in a model reference store (142) database, to generate and store a model of possible combinations of events. The analytics processor (133) makes use of data provided from operation of the model processor (132) and input data from a dimension store (141) to generate analytics results, which are then maintained in the analytics results store database (143) to provide processing (e.g., predictions) related to the model. The input data on which the model processor (132) operates includes a large number of items characterized along a large number of dimensions (sometimes referred to as "dimension data"), in a corresponding dimension store (141) database.

In a more specific aspect, the analytics result store (143) maintains analytics data in an Optimized Columnar Data Format (OCDF). In one such embodiment, the analytics result store (143) uses an OCDF in which data elements are stored in arrays of columns. In a further embodiment, bitmaps are used to compress the data. In a related aspect, compression is achieved by eliminating duplicate keys and/or values. In some embodiments a compressed bitmap indexing is applied to achieve de-duplication and compression. In this manner transmission of large amounts of data is accelerated compared with known techniques.

In related aspects, at or near client devices, local engines store portions of a dimension store (141) along with summarized or portions of analytics data from analytics result store (143), referred to as data cubes, to reduce the need for frequent large transfers of data from a main dimension repository such as the dimension store (141) and analytics result store (143) databases. Data queries are submitted from a client device using the aforementioned bitmap index, and other devices (e.g, a store associated with the requesting client or another client, or the dimension store (141) or analytics result store (143) itself) can fulfill portions of such queries that correspond to data they store. The data cubes that are at or near client devices are referred to as a data mart.

In yet another aspect, model processor (132) creates models by combining and integrating lower level functions, in one specific embodiment using a Declarative Computation and Query Language. In a related aspect, functions defined using the Declarative Computation and Query Language are invoked using a Structured Query Language-like syntax.

In still another aspect, a flow execution planner manages data streams in conjunction with a platform services processor (150) to select among available physical processors which are to be used for particular processing tasks, based on such factors as characteristics of input data.

Given the size and potentially sensitive nature of the data stored, in a further embodiment data are not only transferred in encrypted form (e.g., to a data store at or near a client device), but stored in the data stores of the system (e.g., the dimension store (141) or stores directly associated with client devices) in encrypted form. Each such store responds to a relevant data query by sending corresponding portions of data in encrypted form to the requesting database, where it is again stored, remaining in encrypted form. Not only does the encryption protect sensitive data, but by use of the bitmap index compression, the amount of network traffic needed to transmit such traffic is drastically reduced and so data transfer is accelerated compared with known techniques. Corresponding decryption is performed only as needed upon use at the requesting client device, protecting the security of the sensitive attributes.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 6 illustrates use of record storage fields as discussed in connection with one embodiment.

FIG. 8 illustrates use of namespace-based data access in accordance with one embodiment.

DETAILED DESCRIPTION OF THE DRAWINGS

General System Architecture

Figure 1:
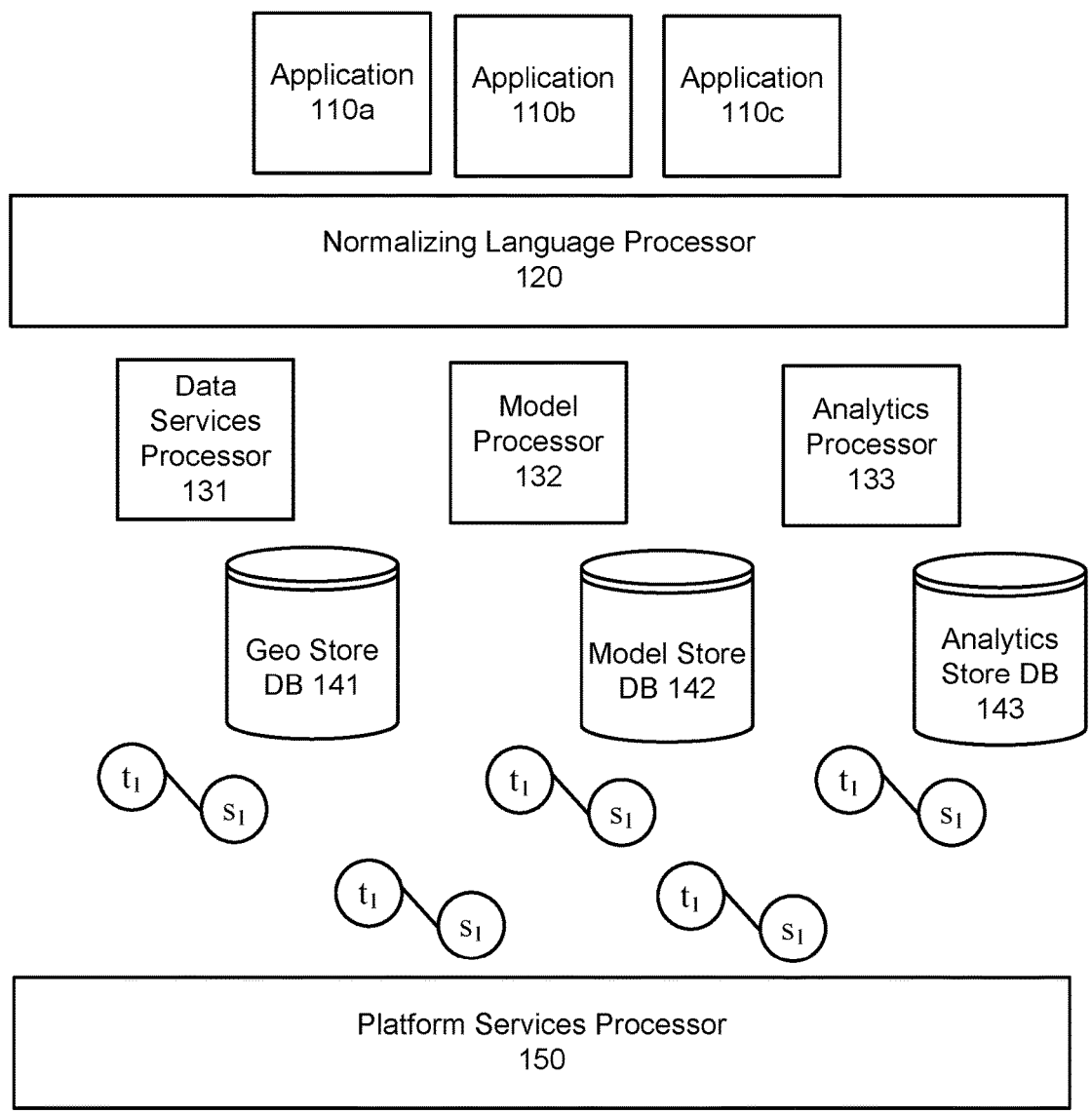
FIG. 1 is an illustration of a computing system according to one embodiment.

As described herein, a computing system 100 includes a normalizing language processor 120 facilitating communicating between a variety of applications 110 providing processing requests and a set of processors 131-133, including a data services processor 131, a model processor 132, and an analytics processor 133, each of which has access to a corresponding data store 141, 142, 143. The data stores are of varying types, depending on the scale and nature of the data that they handle, and are configured to provide selective use of a compressed storage format called Optimized Columnar Data Format (OCDF). The operation of these processors results in data streams (s1 . . . s9) that are sent to a platform services processor 150 for operation in accordance with the applications 110.

The systems described herein can be used for a variety of purposes ranging from municipal planning to loss prediction to supply chain management. Categories of use include, but are not limited to, personnel assignments, resource and asset (e.g. spare equipment) allocation, maintenance scheduling and completion, location planning and business case support (particularly for larger commercial and industrial facilities where critical infrastructure failures can interrupt operations), corporate disaster planning and response, and analysis of other similar scenarios involving allocation of limited or time-sensitive resources OCDF Data Structures As mentioned above, data storage in select portions of system 100 is implemented using OCDF. OCDF maintains data in arrays of columns, using compressed bitmap indexing to efficiently represent model result data (which is often sparse in nature). The data is highly compressed and optimized for analysis through a number of techniques, described in more detail below. These techniques allow extremely efficient querying of large data sets across various processing nodes, as will be apparent from the discussion below.

As detailed below, OCDF eliminates duplicate recurring values, compresses detail keys to smaller byte values by using a specialized Namespace identifier that serves as a key prefix, and compresses sparse sets of detail keys using one or more specialized bitmap indices.

Overview of Exemplary System

Figure 5:
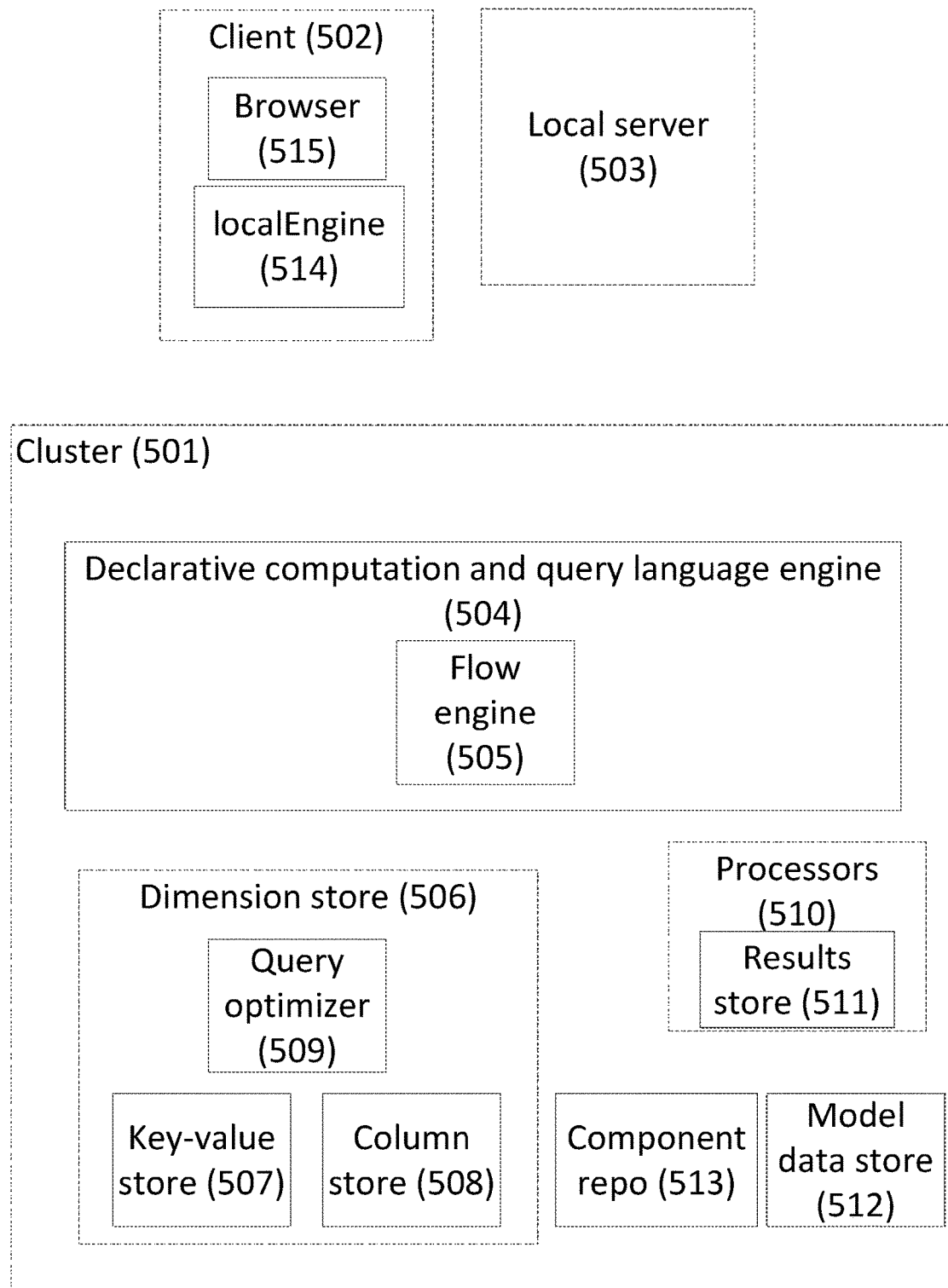
FIG. 5 illustrates a system with a dimension store in accordance with one embodiment.

FIG. 5 illustrates one specific embodiment of a computing system with dimension store features. The system resides across a cluster (501), on a client (502), and on a server (503) nearby the client (ideally local). The cluster (501) contains the declarative computation and query language engine (504) that allows execution of customizable jobs via a flow engine (505). The cluster (501) also contains the dimension store (506) to store input data as the subject of the model. The dimension store (506) includes a key-value store (507) and a column store (508), as well as a query optimizer (509) to query one or both of the stores (507, 508) and join results. The cluster (501) also contains processors (510) for model execution that also contain the results store (511). The model data store (512) provides model data for model execution. The component repo (513) stores function code that can be combined and executed via the flow engine (505). Data is sent from the stores on the cluster (501) to the local server (503), then retrieved by the localEngine (514) in the client (502) for local decryption and querying. The client (502) also contains a browser (515) to run applications.

Data Storage Format for Model Result Data

The amount of data generated by probabilistic models is very large, based on the data explosion described earlier. The data size is impractical to store in current standard formats, and very expensive to analyze (whether stored or not). A system as described herein includes an optimized, compressed storage format as a foundational component, making it feasible to store and query the vast amount of data generated by probabilistic model result output. This data format is termed an Optimized Columnar Data Format (OCDF).

Another challenge in the columnar storage of model result data is the fact that model result data is sparse in nature. Each event in a given model run affects only a sparse subset of the items being evaluated by the model. Traditional column database compression and processing techniques operate best on dense arrays of data (where all rows for all values are present). This is not effective for model result data.

Here is an example data structure for model result data:

```
CREATE TYPE PLT EXTENDS LossResult (
    periodNumber INT,
    eventId INT,
    eventOccurrenceDateOffset SMALLINT,
    itemId BIGINT,
    value FLOAT
)
;
```

This model result record consumes 22 bytes of storage for each record, based on the sizes for each field illustrated in FIG. 6, specifically:

| Field | Storage Size (bytes) |
| --- | --- |
| periodNumber | 4 |
| eventId | 4 |
| eventOccurrenceDateOffset | 2 |
| itemId | 8 |
| value | 4 |
| Total | 22 |

The following is a small sample set of model result data records:

| periodNumber | eventId | eventOccurrenceDataOffset | itemId | Value |
| --- | --- | --- | --- | --- |
| 1 | 1 | 1 | 1 | .0032 |
| 1 | 1 | 1 | 3 | .0057 |
| 1 | 1 | 1 | 5 | .0035 |
| 1 | 3 | 2 | 2 | .0096 |
| 1 | 3 | 2 | 7 | .0075 |
| 2 | 3 | 1 | 1 | .0067 |
| 2 | 4 | 5 | 4 | .0089 |
| 2 | 4 | 5 | 7 | .0760 |

The large size of model result data using traditional relational database storage includes many repetitive values, for periodNumber, eventId, eventOccurrenceDataOffset. In addition, the itemId key is a large value (typically an 8 byte number), also consuming a significant amount of space.

In the described computing system, OCDF is stored in arrays of columns, using specialized compressed bitmap indexing to efficiently represent the sparse nature of model result data. The data is highly compressed through a number of techniques detailed herein. Further, the data, despite its volume, can be queried in an extremely efficient manner across a plurality of compute processing nodes due to the special bitmap indexing.

OCDF achieves these objectives by:
  Eliminating duplicate recurring values (such as periodNumber and eventId in the above example);
  Compressing the detail keys (such as itemId in the above example) from an 8 byte value to a 4 byte value using a specialized Namespace identifier, serving as a key prefix;
  Compressing the sparse set of detail keys (such as itemId in the above example) using one or more specialized bitmap indexes as described below.

Figure 7:
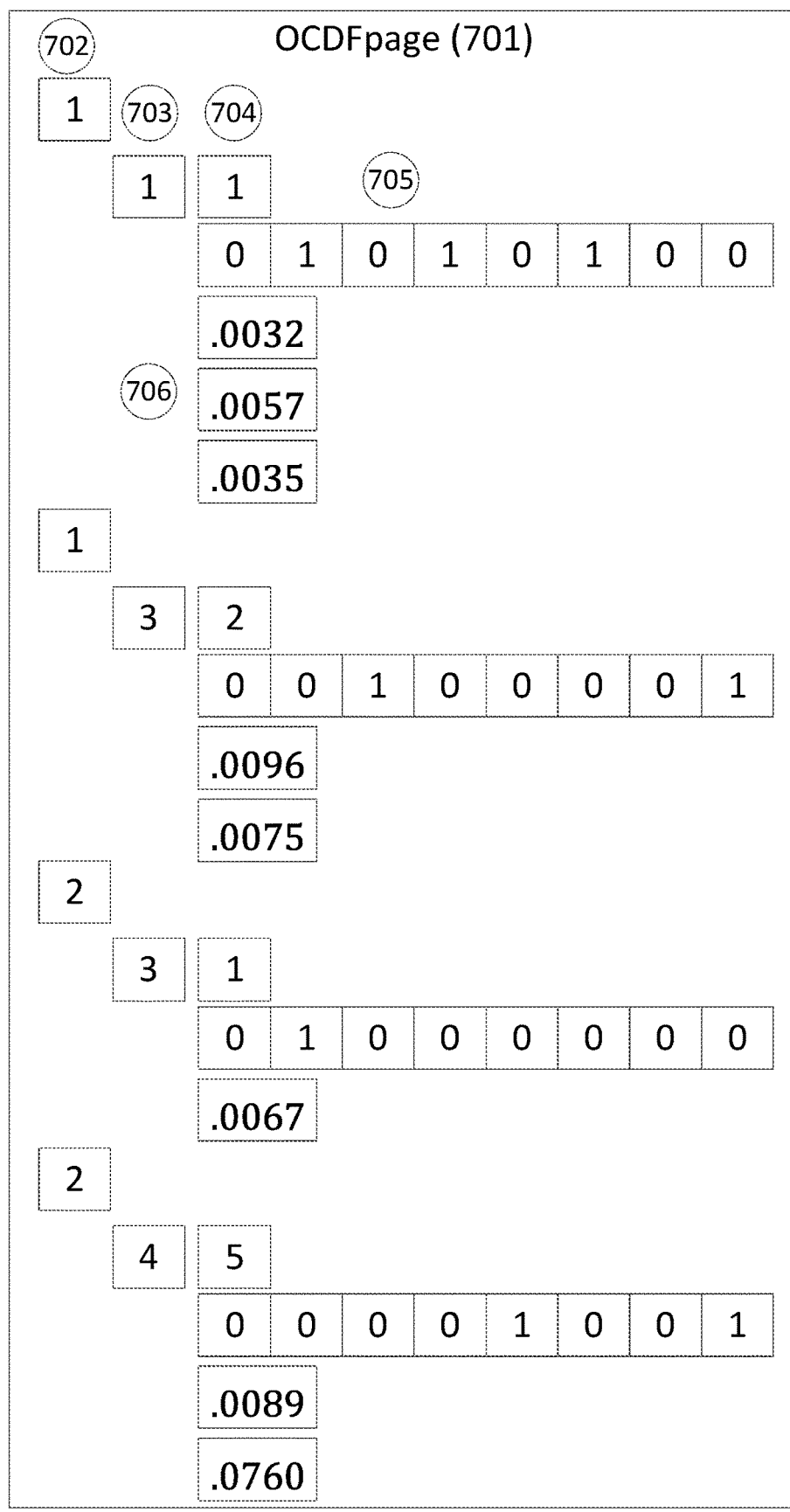
FIG. 7 illustrates an OCDF page in accordance with one embodiment.

FIG. 7 illustrates the model result data example. The OCDFpage (701) includes the periodNumber (702), eventId (703), and eventOccurrenceDateOffset (704). It also contains the itemIdBitmapIndex (705) and an array of values (706).

In this representative structure, the following elements improve query efficiency and compression of the data, storing the data on disk in an optimized format:
  Eliminate duplicate repeating values through a hierarchical or other flattened hierarchy representation (periodNumber, eventId/eventOccurrenceDateOffset);
  Compress detail key values into a compressed bitmap index representation;
  Store result values in a dense fixed-length array, allowing high-speed searching of values in any position.

The compressed bitmap is shown in the above example in its uncompressed form for readability. In one embodiment, the compressed bitmap is implemented using word-aligned bitmap representation (see, e.g., http://en.wikipedia.org/wikiBitmap_index#Compression).

In this simplified example, the uncompressed version would require 176 bytes of storage. The compressed version is reduced to 104 bytes, a savings of approximately 40%. However, expected compression in real model data output sets is far more significant, achieving as much as 80%-90% compression. The compression effectiveness increases based on the ratio of detail result values as compared to the non-repeating parent elements.

The output is stored in one embodiment on one or a plurality of disk pages (OCDFPage), for example each approximately 1 MB in size. The page size can be tuned for the type of storage, and for non-volatile memory (1 MB is ideal for flash or solid-state-disk storage, other types of storage will have different page sizes).

Compressed bitmaps use techniques (e.g., run-length encoding) to reduce the size of the bitmap representation as the number of detail keys expands. Programming libraries to support this technique are commonly available and can be used in various embodiments. These libraries typically support bitmaps that represent 4 byte key values, in bitmap form, with each position in the bitmap representing a unique key value. To maintain an efficient searchable representation, in one embodiment the 4 byte key value ranges between 0 and $2^{32}$ (approximately 2 billion unique key values).

Another property of compressed bitmaps is the ability to obtain the index position of a given bit that is set (i.e., a bit set to 1). This makes it very convenient to associate a dense array of actual model result data values with a sparse index of detail keys. Referring now to FIG. 7, the set bits in the itemIdBitmapIndex (705) represent the position of items for which values (706) are produced. The values (706) are related to the set bits in the itemIdBitmapIndex (705) by their order.

```
// Bitmap:
[01010100]
// Key values represented:
[1, 3, 5]
// Position index of set bits:
[0, 1, 2]
// Model result values:
[.0034, .0079, .0065]
```

Using the above structure, it is possible to determine the following:

The detail key values of the items;
The position index of each model result value associated with each key;
Direct access to the value associated with each key based on the position index.

Thus it is possible to access all relevant data in the set in a meaningful manner with high efficiency and a compressed representation.

Namespace Identifier

As stated earlier, compressed bitmap indexes are limited to a key range of 0 to $2^{32}$ (approximately 2 billion). Among the ways that compressed bitmaps are used in various embodiments, a typical one is to represent the values of itemId detail keys in a compressed manner. Probabilistic models can be applied to almost any entity (Real Property, Persons, assets, etc.), and therefore in most models the set of items to be evaluated will exceed a quantity of 2 billion unique items.

Referring to FIG. 8, a typical embodiment includes a Namespace identifier (801) as a key prefix. This is analogous to top-level domain name as used for routing network traffic on the Internet. One or a plurality of unique Namespace identifiers (801) are assigned to users of a probabilistic model or set of probabilistic models in a given field. Each Namespace has a unique textual name (802) (e.g., Acme-Manufacturing, GustyInsurance), and a unique numeric representation (for example a 4-byte number) (803). The numeric namespaceId (803) can then be used as a prefix (804) of all detail itemId (805) values in an OCDFPage, keeping all detail itemId values under the 2 billion limit.

OCDFPages

Figure 9:
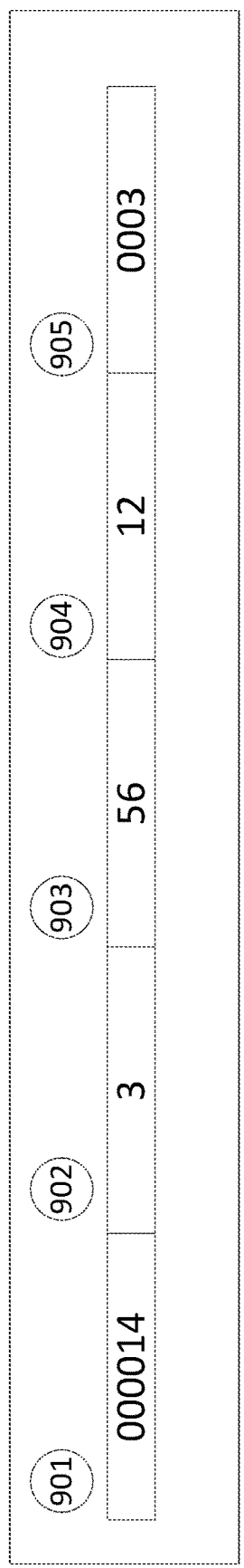
FIG. 9 illustrates an OCDF key in accordance with one embodiment.

Each OCDFPage can be stored in physical memory or on storage, such as a hard disk or non-volatile memory, in an optimized size for the type of storage. Each OCDFPage is stored using a binary key value that can include many attributes for fast retrieval and location of pages. This example shows the concatenated values that uniquely identify a possible OCDFPage key shown in FIG. 9. The key is a concatenation of jobId (901), namespaceId (902), modelID (903), dataTypeId (904), and sequenceId (905).

Thus it is possible to sort OCDFPages on disk, searchable by the binary key. Because the pages typically contain large sets of data, using a long binary key value does not appreciably affect efficiency of the representation (a typical key such as the above example would be approximately 18 bytes, a trivial amount when compared to a 1 MB OCDF-Page value). Using the key it is possible to perform the following operations in an efficient manner:

Locate all keys for a specific jobId;
Prefix all detail itemId values with the namespaceId;
Determine the specific model and data type for the result output.

The use of the OCDFPage key allows an analytics process to "skip" pages, narrowing down the focus to specific data to answer a particular query in a high-performance manner.

An OCDFPage can also contain a single page header, containing non-repeating values. The header can include any desired one-time values, including for convenient access to the OCDFPage key elements (e.g., jobId, namespaceId).

As described above, an OCDFPage can be stored in any computer medium, including physical main memory, disk storage, or non-volatile memory. This makes it very easy to work with OCDFPages within a running software program, for data transmission between a plurality of computer processors connected over a network, and to/from databases or files on any medium.

An important characteristic of OCDFPages is that they do not require serialization or deserialization to transmit between any of these storage media or between computer processors over a network, eliminating the overhead caused by such serialization or deserialization common to most data representations. This characteristic is an important factor in enabling the required efficiency for high-performance queries and manipulation of output results.

Analytics of Model Result Data

Model result data is advantageously used for analytics, to determine probabilities for various scenarios. This is done with queries of the data to answer specific questions. These queries relate model result data to data stored in the dimension store (data regarding items, contracts and other industry related information). Embodiments disclosed herein relate model result data to dimension store data in a manner detailed herein that provides fast query times over very large data sets of model result data.

Figure 2:
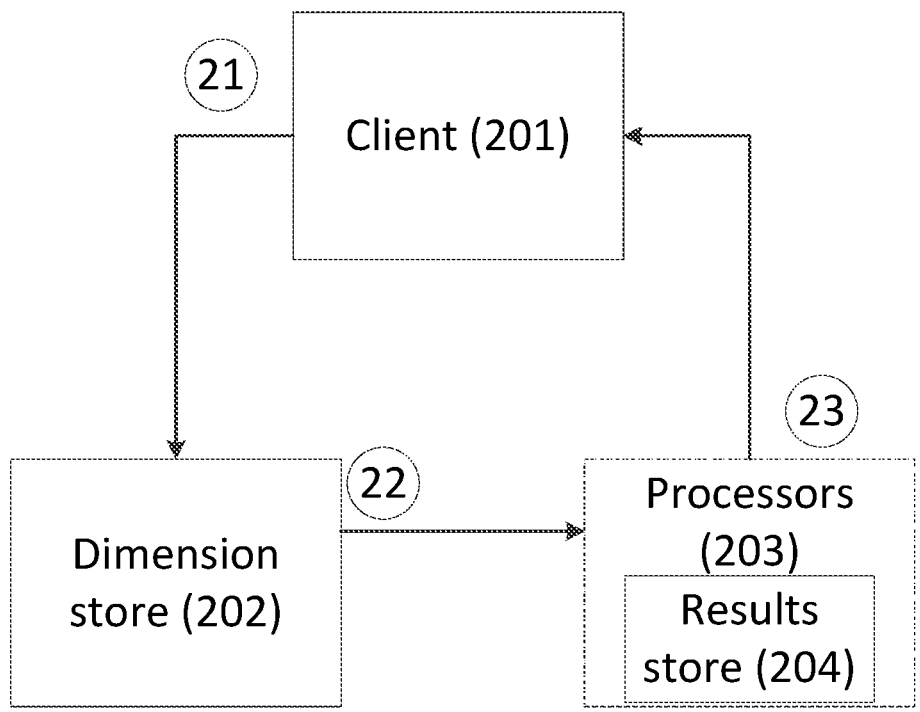
FIG. 2 is an illustration of dimension store operation according to one embodiment.

The dimension store is highly complex, with many types of entities, large numbers of attributes, and complex relationships between those entities. Referring to FIG. 2, a client (201) submits a query (21) to the dimension store (202). The dimension store (202) generates a compact result (such as a compressed bitmap or other compact array) and sends it (22) to the processors (203) that contain the model result store (204). These processors (203) evaluate the query and generate the desired result, returning it (23) to the client (201). This process can be performed in parallel on a scalable set of processors, evaluating large sets of OCDFPages in a highly efficient manner.

There are several types of query operations that are typically performed on the model result data:

Filter queries, limiting the subset of affected items and/or events;
Group by queries, aggregating and grouping results by specific item attributes (e.g., State, Postal Code, Building Type, Contract Value, etc.);
Aggregate queries to summarize data (in conjunction with a filter and/or group by query), including complex non-additive metrics computations.

Each type of query is explained in a separate subsection. It is often desirable by a user to filter the model result data by specific dimension store attributes. Example questions to be answered by queries have been described in the background section earlier. For explanatory purposes, here is a sample query used to describe the process:

```
// Query detail values from a Period Loss Table (PLT)
// for Items in the State of Florida associated with
// Contracts greater than $1MM in value.
SELECT c.accountName, c.value, periodNo,
    eventId, eventOccurrenceDateOffset, itemId, value
FROM PLT p
    JOIN Item i ON p.itemId = i.id
        AND i.namespaceId = p.namespaceId
    JOIN Contract c ON i.contractId = c.id
WHERE i.Address.State = 'FL'
    AND c.value >= 1000000
    AND p.namespaceId = 1
    AND p.jobId = 1234
;
```

Figure 10:
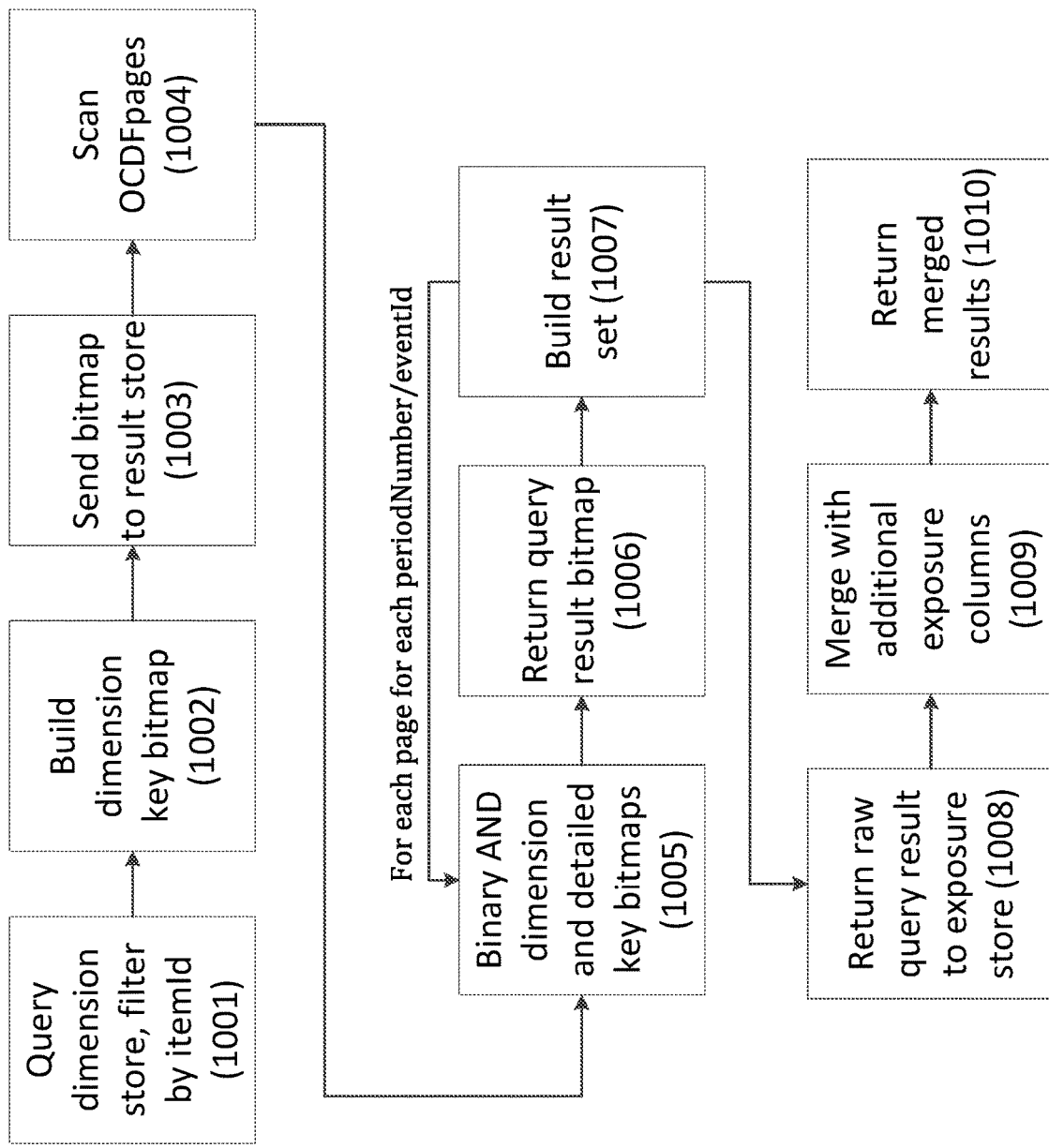
FIG. 10 illustrates filter query processing in accordance with one embodiment.

Referring now to FIG. 10, to perform the filter query, the following steps are performed:

(1001) Execute the query on the dimension store to obtain itemId values for all items matching the filter;
(1002) Build a compressed bitmap of the itemId values (dimensionKeyBitmap);
(1003) Send the compressed bitmap to the model result store;
(1004) Scan through the OCDFPages that match the jobId, namespaceId and data type (PLT);
For each page, iterate over each periodNumber/eventId combination;
  (1005) Compare the dimensionKeyBitmap with the detailKeyBitmap in the OCDFPage using a binary AND operation;
  (1006) The AND operation returns a queryResultBitmap containing the itemId values that are associated with the detailed value in the OCDFPage, thus accomplishing the filter;
  (1007) Build a result set of periodNo, eventId, eventOccurrenceDateOffset, value for all detailed values matching the filter (the rawQueryResult);
(1008) Return the rawQueryResult to the exposure store;
(1009) Merge the rawQueryResult with the additional required columns in the exposure store (c.accountName, c.value) (mergedQueryResult);
(1010) Return the mergedQueryResult for the query.

The method shows how two distinct data stores (dimension store and model result store) are used to accomplish the filter query, by passing compressed key information between the two stores, and merging additional columns from the dimension store as a final step when required. The method described is very efficient, particularly when implemented on a cluster of servers, each with its own non-volatile memory storage. OCDFPages can be processed on a single server at the rate of 100 s (or up to 2000 or more) pages per second. The analytic query processing can be performed in parallel across many servers (nodes), processing terabytes of data in seconds. This approach is similar in some respects to other Big Data processing schemes (e.g., Hadoop), however using the compressed OCDFPages and utilizing a dimension store query that produces a bitmap, followed by processing for the model result store by comparing such bitmaps for results offers significant performance advances over prior approaches.

A group by query, optionally in combination with a filter query, can be processed in a similar manner. Here is the previous example query, extended with group by summarization:

```
// Query a sum of detail values from a Period Loss Table (PLT)
// for Items in the State of Florida associated with
// Contracts greater than $1MM in value.
// Group by the Contract accountName and Item postalCode.
SELECT c.accountName, i.Address.postalCode, SUM(value)
FROM PLT p
    JOIN Item i ON p.itemId = i.id
        AND i.namespaceId = p.namespaceId
    JOIN Contract c ON i.contractId = c.id
WHERE i.Address.State = 'FL'
    AND c.value >= 1000000
    AND p.namespaceId = 1
    AND p.jobId = 1234
GROUP BY c.accountName, i.Address.postalCode
;
```

Figure 11:
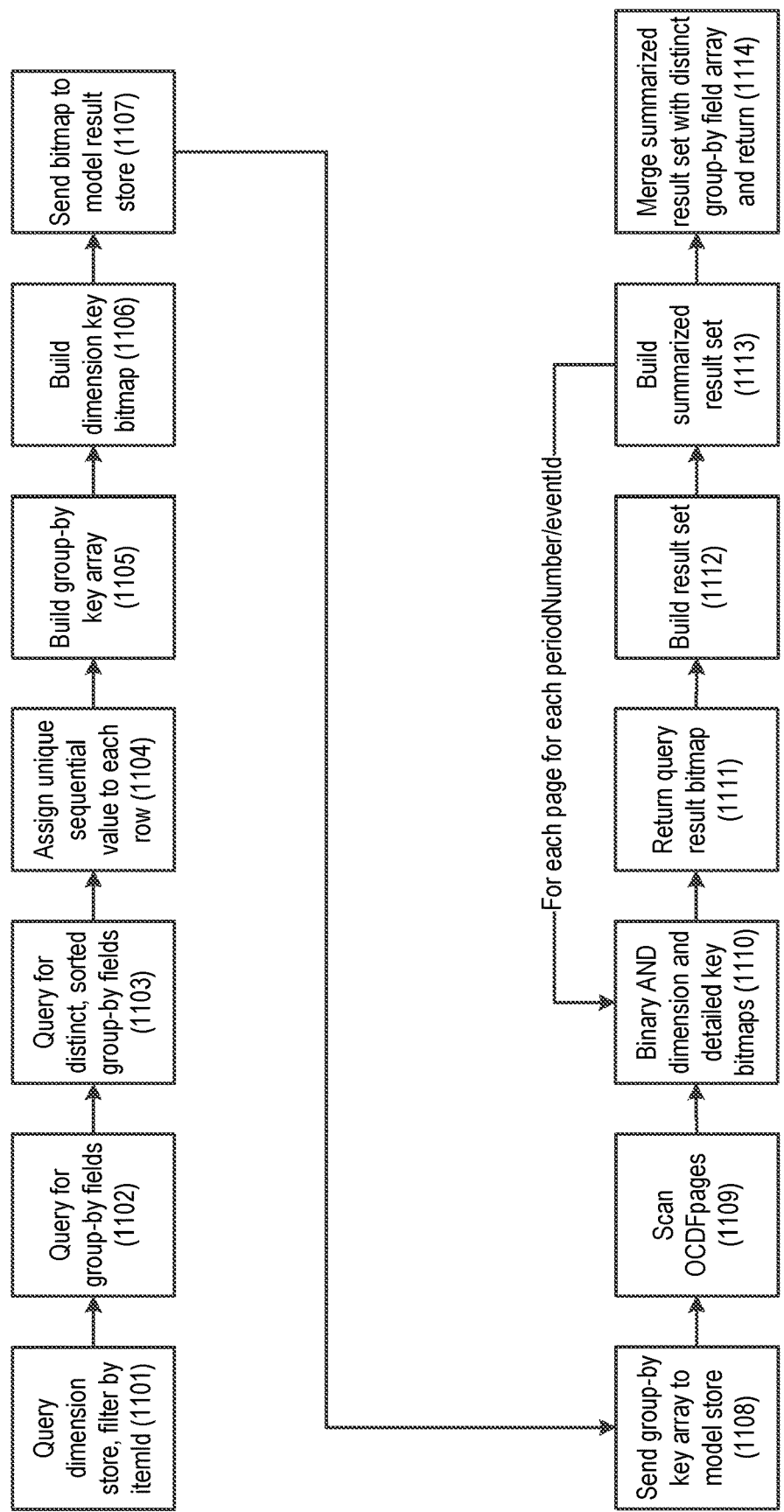
FIG. 11 illustrates grouping by/filter query processing in accordance with one embodiment.

Referring to FIG. 11, to perform the group by/filter query, the following steps are performed:
(1101) Execute the query on the dimension store to obtain itemId values for all items matching the filter;
(1102) Perform a second query on the dimension store to retrieve the group by key fields (c.accountName, i.Address.postalCode in this example) along with the associated itemId key, sorted by itemId key (itemByGroupByKeyResult);
(1103) Perform a third query on the dimension store to retrieve a distinct list of group by key fields, sorted in group by key order (groupByKeyResult);
(1104) Assign a unique sequential value to each row in the groupByKeyResult (groupByKey);
(1105) Build an array of groupByKey values, one element for each itemId, by iterating over the itemByGroupByKeyResult (groupByKeyArray);
(1106) Build a compressed bitmap of the itemId values (dimensionKeyBitmap);
(1107) Send the compressed bitmap to the model result store;
(1108) Send the groupByKeyArray to the model result store;
(1109) Scan through the OCDFPages that match the jobId, namespaceId and data type (PLT); For each page, iterate over each periodNumber/eventId combination;
(1110) Compare the dimensionKeyBitmap with the detailKeyBitmap in the OCDFPage using a binary AND operation;
(1111) The AND operation returns a queryResultBitmap containing the itemId values that are associated with the detailed value in the OCDFPage, thus accomplishing the filter;
(1112) Build a result set of periodNo, eventId, eventOccurrenceDateOffset, value for all detailed values matching the filter (the rawQueryResult);
(1113) Build a summarized result using the groupByKeyArray (rawGroupByQueryResult);
(1114) Merge the rawGroupByQueryResult with the groupByKey result and return the response to the query.

The most common process is filter/group by queries requested by a user, to determine probabilities for given subsets of the model result data based on known or likely factors (such as geography, value of contract, etc.). However, in many situations, the user may not know all types of queries that should be requested, due to the large number of attributes in the dimension store. For example, it is possible for a user to request many queries, and yet miss one or a plurality of important attributes that drive a high probability of risk or occurrence. Embodiments described herein address this with an inverse query. The goal of an inverse query is to identify the subset of detail data that presents the highest likelihood of risk or occurrence across the entire result data store for a given model run, and then interpret that result automatically by evaluating it against the dimension store.

An inverse query can answer a question such as:

Identify the 1 in 250-year probability of risk from a given model run, and identify all key attributes of the underlying items (and their associated contracts and structure), showing the contributory weighted values of each attribute.

As a specific example, an inverse query could inform the user that the highest probability of risk is driven by residential properties over $1 MM in the State of Florida, with contracts written by a specific office of the company.

Figure 3:
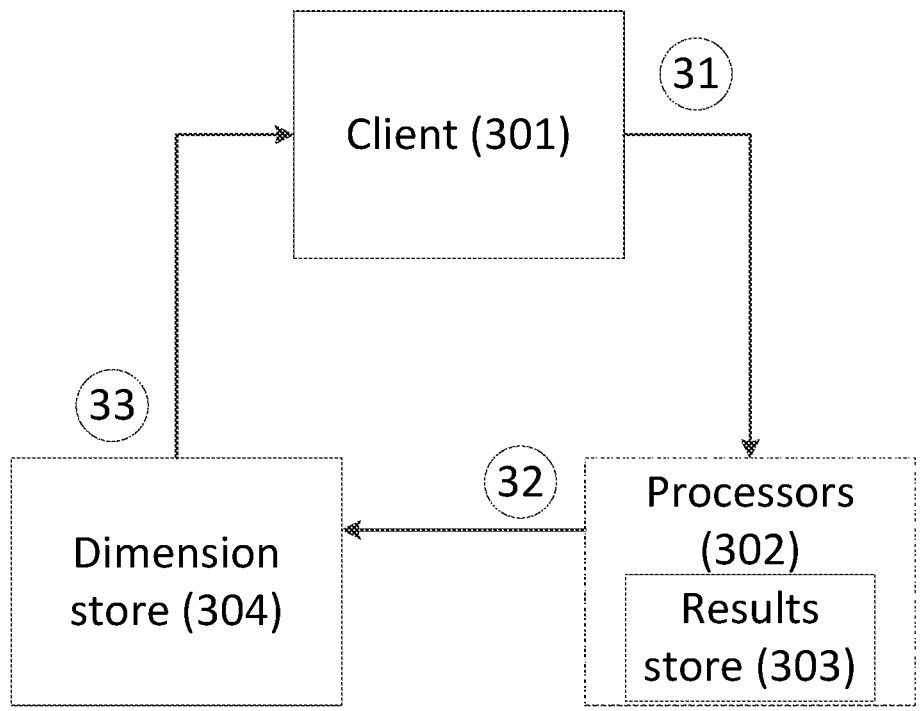
FIG. 3 is another illustration of dimension store operation according to one embodiment.

An inverse query is supported via a method composed of the following steps as shown in FIG. 3. A client (301) submits an inverse query (31) to the processors (302). The processor's (302) results store (303) generates a compact result (such as a compressed bitmap or other compact array) and sends it (32) to the dimension store (304). The dimension store uses a machine learning technique to generate the result, returning it (33) to the client (301).

The inverse query can be expanded to include many types of summarization functions and weightings to interpret meaning from the raw data.

Complex Metrics

Analysis of model result output requires many types of metrics. Simple summation metrics are easy to compute and can be done with existing approaches. However, given that probabilistic models generate simulations of potential events, more advanced non-additive metrics are required.

For example, in the insurance industry, metrics such as Aggregate Exceedance Probability (AEP) and Occurrence Exceedance Probability (OEP) are typical in analyzing catastrophe model output. These non-additive metrics rely on percentile functions for deriving the result. A percentile function requires a sorted data set to determine the result, thus this type of computation can be computationally intensive and often infeasible in large model result data sets.

To address this issue, embodiments discussed herein use a technique called value binning. Value binning reduces a large set of values to a much smaller subset, with each value in the smaller subset representing an approximate value based on a range. Here is an example of value binning:

| Raw Values |
| --- |
| 0.0638 |
| 0.6431 |
| 0.6493 |
| 0.6473 |
| 0.4562 |

| Binned Values | Value Count |
| --- | --- |
| 0.06 | 1 |
| 0.45 | 1 |
| 0.64 | 3 |

Thus a smaller set of less precise values results, each with a count that can be used for weighted percentile functions. This allows non-additive metrics to be performed faster, consuming less processor memory than traditional computations on very large data sets. Prior known techniques are used to preserve as much accuracy as possible, yielding a statistically valid result.

There is another use for value binning supported by the systems described herein. In many models, certain events have low-impact, widespread impact across the items under evaluation. For example, a wind storm event that covers a wide area, yet has a relatively low wind speed (e.g., 20 MPH), could affect many items being modeled, each sustaining a small simulated loss. This type of event is often the source of a substantial quantity of detail model result data values, and in some cases the majority of model result data is of this type.

Some modeling approaches elect to eliminate such data from the model result data entirely, as "low impact events." However, given that such events may affect the preponderance of items under evaluation, the cumulative potential risk may be quite high, particularly when considered in economic terms.

Using value binning to address this problem, the OCD-FPage concept can implement a small range of binned values, each with an associated compressed bitmap index to associate the specific items affected by each binned value.

For example, assume that 1 million items are under evaluation by a model, and a particular low-impact event hits 80% (or 800,000) items from the total set. The projected detail risk values range in economic impact to each item in a given range from $8 to $22. The values can be binned to the nearest $1, providing a set of 15 binned values. A compressed bitmap index is associated with each binned value, specifying the itemIds that are included in each binned value.

Here is an example pseudo-page to show the concept:

EventId: 12
    [10101000] $8
    [01000000] $9
    [00010011] $10
    ...

The compression and processing performance for this approach is significant, in some cases with large data sets reducing the data size on disk (or in memory) by over 99% for a significant portion of events.

Distributed Column Store

A column store is a type of database that organizes data by column, instead of by row as in a traditional relational database, or by object in a key-value store. The advantage of a column store is that values can be compressed by column, and queries can be run more efficiently, particularly when there is no specific index that can be used.

In the dimension store used in system 100, support is provided for queries on any of the attributes stored, including all entities such as item, contract, business structure, etc. The objective is to provide the ability to run any type of query against the dimension store, regardless of the combination of entities or attributes, using the result for filter or group by queries on the model result store.

Existing column stores accomplish this objective, however they are limited when applied in a scalable environment. The reason is that a column store runs queries by performing a scan of the relevant columns. When such a database is partitioned across a network, it generally is only workable with a single partition key (e.g., date range), and only produces efficient results when a query includes a filter on the partition key. When the partition key is not included in a query, the queries must be run on all servers in the cluster, and results must be constructed in a centralized place. This is costly in terms of network performance, processor resources, and memory.

In addition to scalability, the field of probabilistic modeling requires the ability to store both complex objects (as in a key-value store) and column representations (as in a column store). Some queries (such as by itemId) can be best answered by the key-value store, and other more general queries are best answered by the column store.

Figure 4:
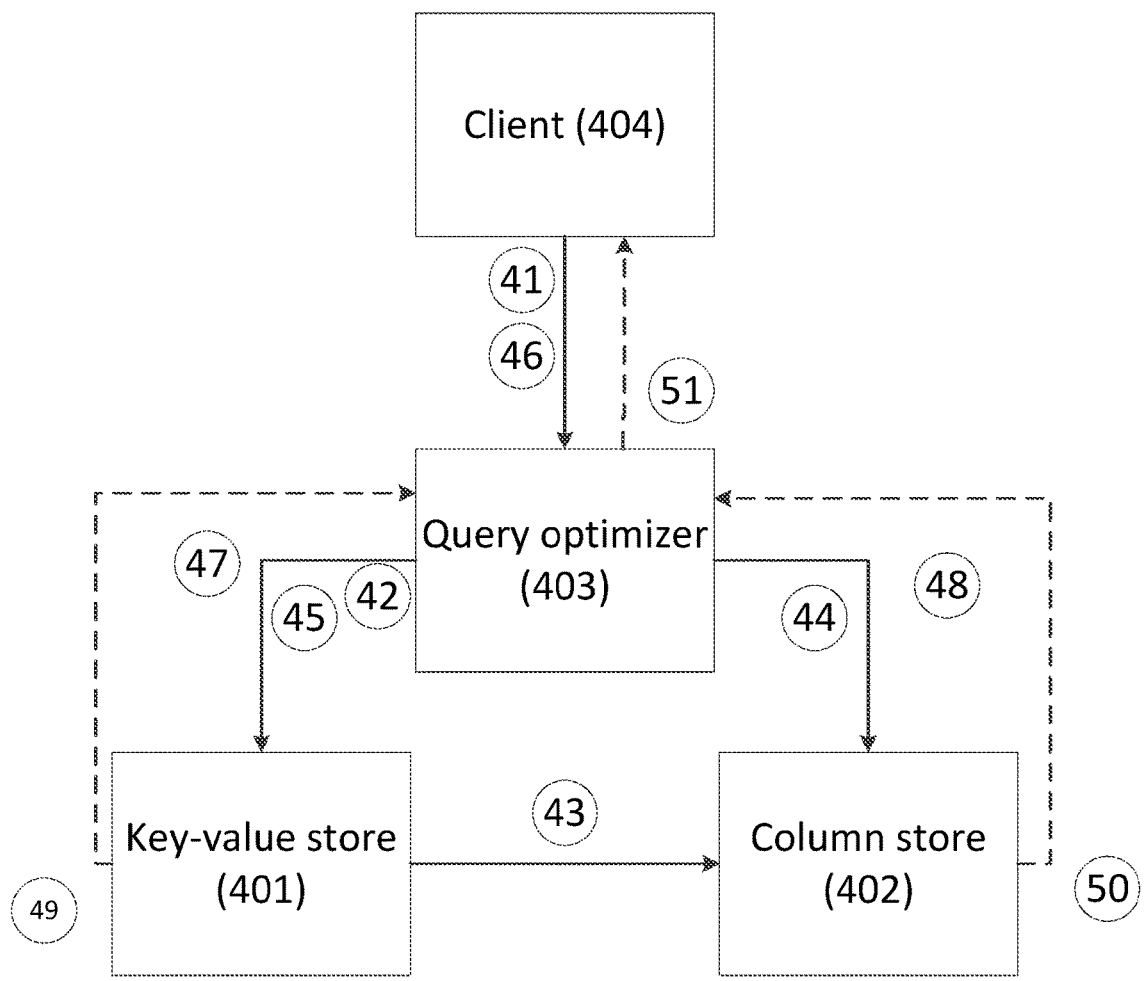
FIG. 4 illustrates use of key-value and column stores in accordance with one embodiment.

Referring to FIG. 4, use a single engine, or alternatively two engines running in close coordination, to support both a key-value store (401) and a column store (402) access. The query optimizer (403) coordinates between both stores, deciding on the specific portion of the query that can be served with the best performance by obtaining data from the key-value (401), column store (402) or both. The data can be partitioned across a number of nodes through the use of the namespaceId presented earlier (a single partition key similar to other column stores).

In case a client (404) inserts data (41), the query optimizer (403) directs the write (42) into the key-value store (401) for write optimization. Using replication mechanisms (43) such as write-ahead logs, indexes are created on the column store (402), which is optimized for reads. In case the query optimizer (403) observes that a certain query pattern can benefit from creation of an index, an index may be created (44, 45) on the key-value store (401) or column store (402). Two potential indexes are: a column store index linking to the key-value store by rowID, or a key-value store index linking to other indexes by an array of foreign keys stored in the value. In case a client (404) reads data (46), the query optimizer (403) may direct the query (47, 48) to one or both of the stores (401, 402). The data is returned (49, 50) to the query optimizer (403) for joining and returned (51) to the client (404). The query optimizer (403) may interact multiple times with the stores (401, 402) for a single query.

An additional capability of the system is to efficiently scale a column store across a plurality of distributed servers (nodes). This is done by automatically observing queries and building views dynamically through a query optimizer such as that described in copending U.S. patent application Ser. No. 14/046,875 filed Oct. 4, 2013. The objective of scaling is to reduce the need to query the entire plurality of servers, or even a group of servers containing data specified by a single partition key. The approach builds dynamic views of a replicated portion of the column store, partitioned and sorted by an alternate attribute. For example, consider a query such as:

```
// Find all contracts that have a name starting with 'Walmart'.
SELECT c.name, c.id, c.value
FROM Contract c
WHERE c.name LIKE 'Walmart%'
;
```

Assume the existing column store is partitioned by namespaceId. The namespaceId is not in the example query, thus all servers must be queried in parallel to find all occurrences of rows or objects that fulfill the query. The results from all servers must then be consolidated, often on another server.

Using the generated view in the embodiments discussed herein, a special view is created using the Contract.name as the partition key for the column store. The column store may contain a copy of all columns, or preferably on a subset of commonly requested columns from observation of queries. If a view is partitioned by the Contract.name, the above query can determine exactly which server (or servers, a few at most) contain information relevant to this requirement. If the view contains all columns needed to fulfill the query projection, the query can be supplied just from these servers.

Figure 13:
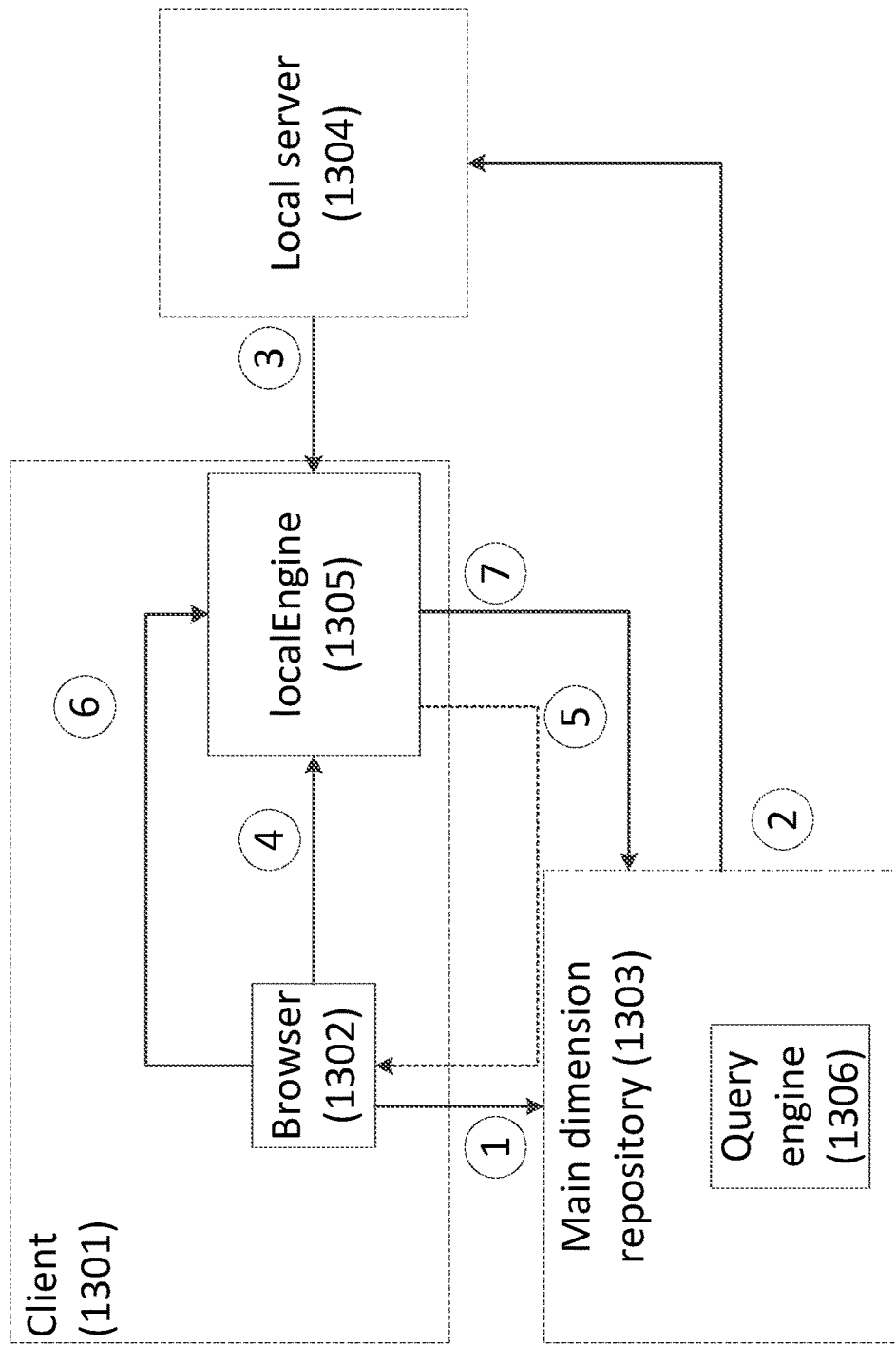
FIG. 13 illustrates a data mark implementation in accordance with one embodiment.

Referring to FIG. 13, in many cases, a client (1301) will submit a query (131), requiring the query optimizer (1302) to join the query results from a subset view of the column store (1303) with additional data from the full key-value (1304) store. In this example the data is stored by primary key (e.g., Contract.id). The systems discussed herein addresses this problem by querying (132) the column store (1303) and returning from the subset of the column store a compressed bitmap index, which is sent (133) to the query optimizer (1302) servers. The query optimizer server (1302) then sends (134, 135) the bitmap index to all servers (1303, 1304) that can fulfill portions of the query based on primary key or namespaceId partitioning, then each server can efficiently return (136,137) its portion of the query. Results are assembled at the query optimizer (1302) servers and returned (138) to the client (1301). The advantage of this approach is to effectively use a compressed bitmap of key values as the join mechanism with which to query for additional data across specific nodes to fulfill the entire query, thus reducing the number of servers needed to fulfill the query. This reduces search time, overall retrieval time and network traffic and coordination of servers, allowing better targeting of servers that contain required data to fulfill the query.

Data Encryption

Security of data is a prime concern, particularly data in the dimension store. There are existing proposals to encrypt data in a database, such that the data can be operated on in encrypted form (see http://www.mit.edu/~ralucap/CryptDB-sosp11.pdf).

For the field of insurance and many related fields, it is important to exchange data from the dimension store, and summarized model result data, between different organizations transacting business or otherwise sharing data.

The systems discussed herein use the encrypted data mechanism for exchanged data, coming directly from the database and being sent to another collaborating entity. A key is then sent, allowing the collaborating entity to read the data. The data is then stored in their copy of the database in encrypted form; thus the data is always encrypted and cannot be read by any other party or entity. This approach is much different than simply using an encrypted network connection, as the data then arrives and is stored in a decrypted readable form in both the source and target database. Here the approach is to keep the data encrypted at all times in all databases where it is stored, as well as over a network connection. The data cannot be viewed without a proper access key.

Summarized Data Sets

As discussed earlier, the volume for model output data is extremely large. The systems discussed herein make it feasible to perform meaningful queries against the data in a reasonable timeframe (typically seconds to a few minutes). However, this is still too slow for many user interactions, which should deliver sub-second response time.

To address such situations, a specialized data mart is employed. This is illustrated in FIG. 13. Via a client (1301) through a web browser (1302), a user specifies a group by query (1), including all desired dimensions and metrics they wish to analyze. The query is sent to the main dimension repository (1303). The query is performed by the query engine (1306), generating a summarized and optionally encrypted result set called a dataCube. The resulting dataCube is sent (2) to a server (1304) close to the user, typically hosted within the user's organization. In one implementation the dataCube is then retrieved (3) by the localEngine (1305) running in the client system (101), which locally stores the dataCube. The client system can be a standalone desktop, laptop or other workstation with a processor that hosts the browser accessed by an end-user. In another implementation, the dataCube and encryption can be performed on a local server (1304). An application running in the user's browser (1302) communicates with the localEngine (1305) to query (4) the data. The data is decrypted by the localEngine (1305) and returned (5) to the browser (1302). Via the browser (1302), a user may modify data (6) on the localEngine (1305). The localEngine (1305) encrypts the changes and sends (7) them back to the main dimension repository (1303).

Having the localEngine (or optionally local server) perform both encryption/decryption and querying of the data- Cube preserves encryption until the data is read. Having the dataCube stored in the localEngine on the client (or optionally local server) delivers very fast, sub-second response times for analyzing the dataCube. This supports both data security and fast query response times.

Micro-Server Embodiment

In one embodiment, a micro-server hardware appliance is used to implement the system in a distributed manner. The appliance is composed of a CPU, Memory and local storage (non-volatile memory is a desired implementation). This appliance can distribute the data storage across thousands of nodes, within a centralized cloud infrastructure, a distributed infrastructure across many customers, or a combination of both. The appliance supports the various functions described herein, including data encryption, compression, fast processing of bitmap indexes and data, very fast input/output, the dimension store, and the model result store of OCDFPages.

In one particular implementation, the appliance uses a Field Programmable Gate Array chip to speed processing of common critical functions. These functions include:
Encryption/decryption
Non-additive metrics
Additive metrics
Bitmap index processing
OCMFPage processing Thus virtually all capabilities detailed herein may be provided by an FPGA CPU or other type of Application Specific Integrated Circuit (ASIC).

Support for Multiple Programming Languages and Execution Environments

Traditional probabilistic modeling techniques can be implemented by a variety of programming languages and execution environments, such as C/C++, Matlab, Python, Java, .NET/C#, R, and many others. Often, the business activities of model development and model implementation/deployment occur separately and are often executed by different teams within an organization, or even across different organizations. Additionally, these different teams are skilled in different techniques and tools, so it is desirable to allow each team to use its preferred programming language and/or execution environment.

This poses a challenge for a high performance data processing system. Inter-process communication is slower than intra-process communication, as processes must communicate with each other by calling low-level functions provided by the underlying operating system, or by using networking.

To overcome this, in some embodiments the transfer of data is communicated between processes using a structured data format which is transmitted using shared memory or local networking, relying on the structure of the data to optimize throughput. One example of such a data structure is an append-only file, stored either on disk or in memory. An example of an append-only file is a database replication log. Another example is a Write-Ahead-Log (WAL), a data structure that is commonly used in many database applications. Records appended to such a file are sized to optimize for throughput. One such record format is the OCDFPage format mentioned above.

In order to support application logic in multiple environments, an implementation-independent means of expressing computation is required. The framework contains an optimizer to determine the most efficient implementation for models or model functions, whether intra-process (one language), or inter-process (multiple languages) such as using a WAL and the ODCFPage format. One example of such a means is the declarative language described below.

Declarative Computation and Query Language

In many applications, it is advantageous for a Probabilistic Modeling system to account for and manage a plurality of variables that affect the execution of a given Modeling Run or subsequent Analysis of Model Result Data. For example, such variables may affect the preparation of input data, the selection of algorithm used for a particular processing step, the choice of reference data, the number of samples to perform, the kind and number of processing elements (e.g. computers, virtual machines) to use for processing, the specific implementations of intermediate processing, varying programming languages and execution environments, and any other attributes of a model run or analysis. If a system were to be constructed to account for each of these variables explicitly, the size and complexity of the system's codebase and runtime footprint would grow exponentially and could become too costly and complex for an organization to maintain.

In order to manage this complexity, a Declarative Computation and Query Language is implemented wherein a given computation is specified in the abstract and specific variants of the computation are supplied at run-time by various means. An implementation of such a language allows model developers and analysts to break a large-scale or complex computation down into separate functions and then organize such functions in different arrangements to produce the multitude of computations mentioned previously. The ability to develop models as an integrated flow of smaller functions (vs. the traditional single function) enables significant advantages, including the ability to scale each function independently across multiple processors, assign individual programmers to the development of individual functions, and to extend re-use of common functions across many models. Another advantage is the ability to allow a user of a model to develop their own functions, interpolated between, or entirely replacing one or a plurality of functions provided by the model developer. This offers the user the ability to customize or tailor the model logic and result output to meet specific needs. Further, because the functions are specified abstractly, the specific implementation of a function is free to vary at run-time, provided that the implementation properly confirms the function's interface. One implementation of such a function declaration is as follows:

```
CREATE FUNCTION Multiply( a DECIMAL, b DECIMAL )
RETURNS DECIMAL;
```

Functions defined using such a Declarative Computation and Query Language may be invoked using Structured Query Language (SQL) (REFERENCE: SQL-92) or an extension thereof. For example, to evaluate the DECIMAL (a, b) function one implementation may use the following SQL:

```
SELECT Multiply( 2, 2 );
```

In another implementation, future invocations of such functions may be specified by grouping functions into Streams of data. Stream Definitions are specified by an extension of Structured Query Language.

```
CREATE STREAM s_LineItemTotal AS
SELECT Multiply(qty, unit_price) as ext_price
FROM v_orders;
```

These Stream Definitions may be arranged to form an abstract computation graph by applying functions to data from received from a variety of sources, which are collectively referred to as Stream Producers. Examples of Stream Producers include but are not limited to database tables, other Stream Definitions, and Functions that return a plurality of values.

Functions that return a plurality of values are referred to as Stream Producers. A special class of Stream Producers exists in which members do not accept explicit input arguments. These are referred to as Stream Origin Functions. An example of a Stream Origin Function reads from a comma-separated-values file located on a file system. Another example can consume messages from a message-queuing system and yield the messages to downstream Functions. In one implementation, Stream Origin Functions may be specified by an extension of Structured Query Language.

```
CREATE STREAM FUNCTION ReadCSV(filename VARCHAR) ( )
RETURNS (fields ARRAY(VARCHAR));
```

Functions that consume a plurality of values are collectively referred to as Stream Consumers. Examples of Stream Consumers may include the ability to write input data to a file on a file system, a database table, or a network connection, or to a user interface. In one implementation, Stream Consumers may be specified by an extension of Structured Query Language.

```
CREATE STREAM FUNCTION
FileWriter(filename VARCHAR)(id BIGINT, value VARCHAR)
RETURNS VOID;
```

Stream Consumers that are also Stream Producers are called Stream Functions. Stream Functions may both consume a plurality of values and produce a plurality of values. Examples of Stream Functions may include per-record transformation, record filtering, aggregation or partial-aggregation such as summing, and disaggregation (e.g. flat-Map) such as string splitting or Event sampling. In one implementation, Stream Functions may be specified by an extension of Structured Query Language.

```
CREATE STREAM FUNCTION
Split(separator VARCHAR) (value VARCHAR)
RETURNS (item VARCHAR);
```

Functions, Stream Producers, Stream Functions, and Stream Consumers may be combined in a variety of ways to express a given computation graph. A subset of this graph is referred to here as a Flow. A given Flow maybe be paired with certain configuration Settings and then it may be started by a user action. When a Flow is started, all of the Stream Producers are triggered to begin producing data and all of the Stream Consumers are prepared to receive input. In one implementation, a Flow may be specified using an extension of SQL:

```
CREATE FLOW ExampleFlow;
ALTER FLOW ExampleFlow ADD STREAM s_LineItemTotal;
```

A variety of Settings may be specified which affect the execution of a Flow. In one implementation, Settings may be specified using variable assignment expressions in SQL. For example:

```
SET @foo = 'bar';
```

The members of a Flow (Stream Definitions, Stream Producers, Stream Consumers) may have access to Settings at runtime. Settings may specify arbitrary values that may apply to multiple Functions or may only be used by a single Function.

Settings may be used to select the specific implementations of Functions. In one implementation, a user may select a Function Implementation developed in the Java programming language:

```
SET @functions.Multiply.runtime = 'jvm';
SET @functions.Multiply.library = '/path/to/foo.jar';
SET @functions.Multiply.class = 'com.example.FooMultiply';
START FLOW ExampleFlow;
```

In one implementation, Functions may interpret a language such as described in previously referenced copending U.S. patent application Ser. No. 13/914,774, filed Jun. 11, 2013 and published as US 2013/0332474, to apply contract terms to Losses or other financial values.

Figure 12:
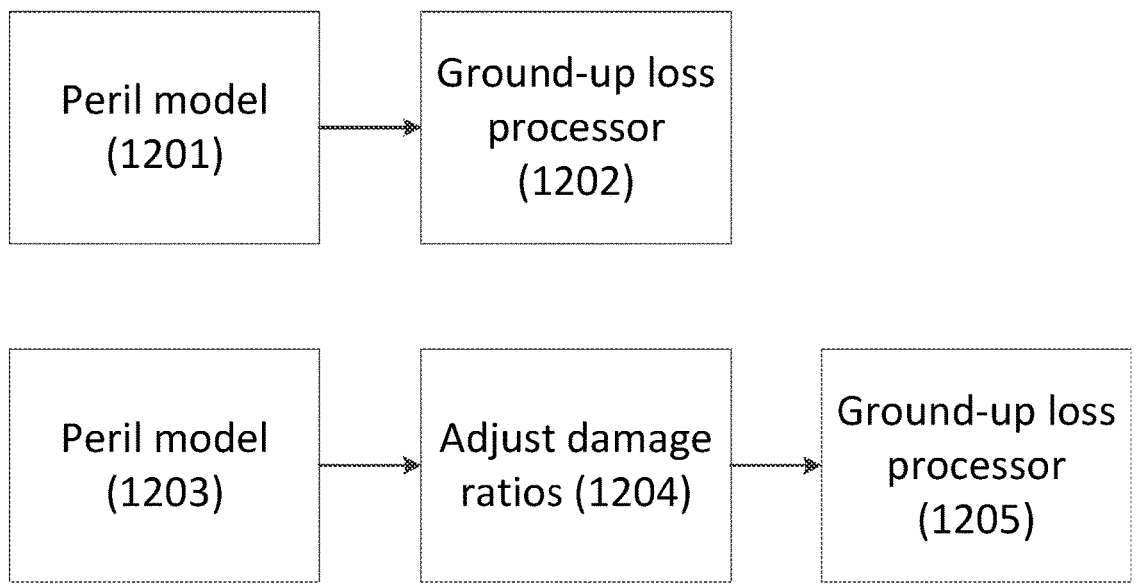
FIG. 12 illustrates a sample flow in accordance with one embodiment.

A notable use of flows is the ability of a user to tune the model by adjusting the flow. Referring to FIG. 12, a sample flow includes a peril model (1201) and a ground-up loss processor (1202). The second flow is a modification of the first with the peril model (1203) flowing through an adjustment of damage ratios (1204) before the ground-up loss processor (1205).

Execution Optimization

While a Flow may define the logical processing of a given Model Run or Analysis, it does not explicitly specify the execution strategy, as doing so would deprive the system of the desired flexibility. In order to achieve optimum performance, a Flow Execution Planner may be used to select the utilization of physical processing resources, as well as re-write the processing graph prior to the initiation of data flow in order to optimize inter-Function and inter-Stream data transfer, as Function invocation may cross system processes or network connections.

Additionally, in certain cases, entire branches of computation may be eliminated by selecting function implementations based on characteristics of the input data. For example, an implementation pertaining to insurance may eliminate the computation of post-earthquake fire damage if certain attributes of the affected Risk Items or Insurance Contracts covering those Risk Items so indicate.

In another implementation, a Flow Execution Planner monitors system performance and alters the execution characteristics of a Flow in order to adapt to changing data patterns without restarting the Flow's execution. This may use many of the techniques identified in the Self-altering database as specified in U.S. patent application Ser. No. 14/613,356 entitled "DYNAMIC MODIFICATION OF A DATABASE DATA STRUCTURE" filed Feb. 3, 2015 and U.S. provisional patent application No. 61/988,861, entitled "DATABASE DEVICE AND PROCESSING OF DATA IN A DATABASE" filed May 5, 2014, the contents of which are incorporated by reference as is fully set forth herein. The risk exposure value calculator 440 then calculates a risk exposure value using the meta-data stored in the asset database 420, the various weighing factors, the local baseline database 424, and the risk factor database 436. The calculation involves two sets of weights, one from the combined map generator 432 and one from the risk factor database 436, and a value of an asset from the asset database 420. In one implementation, weights from 436 are applied against to the asset value first, causing an interim asset value allocation across a group or a type of geographic representation points. Weights for individual points within the group or type are then applied to the interim asset values, thus generating a risk exposure value for each point. In some embodiments, weights are provided relative to some normalized level, such as a dynamically determined normalization point allowing good dynamic range of weights above and below the normalization point. Depending on application, weighting factors may be provided as input to the system in multiple forms (currency, percents, time, etc.); those skilled in the art will recognize that conversion to common forms may be required in such situations. In other environments, multiple forms may be supported directly (e.g., normalization points may be specified in both miles and kilometers to avoid the need to convert individual measurements that may be supplied in either format).

Computing Device

Figure 14:
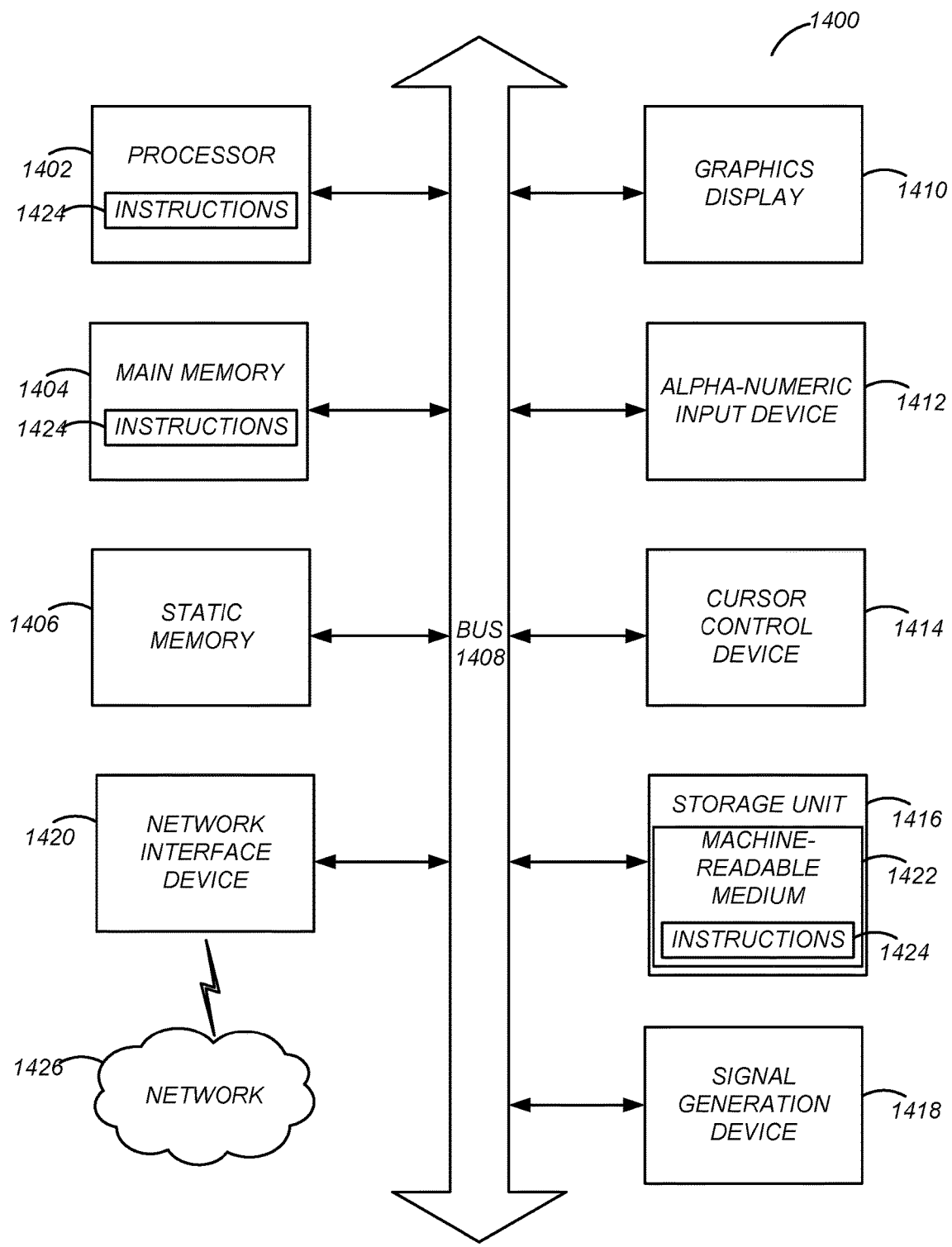
FIG. 14 is a block diagram illustrating components of an example machine able to read instructions from a machine-readable medium and execute them in a processor (or controller) according to one embodiment.

FIG. 14 is a block diagram illustrating components of an example machine able to read instructions from a machine-readable medium and execute them in a processor (or controller). Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

System 100, as well as the other processing devices detailed herein, in various embodiments, are implemented using one or more computers configured such as computer 1400 discussed above. Those of skill in the art will recognize that based on processing requirements, several various components may be implemented on a common one of such computers, or several of such computers can operate in a collaborative fashion to implement one or more of such components.

OTHER CONSIDERATIONS

While particular embodiments are described, it is to be understood that modifications will be apparent to those skilled in the art without departing from the spirit of the disclosures herein. The scope of any disclosure is not limited to the specific embodiments described herein. Other embodiments, uses and advantages of the disclosures will be apparent to those skilled in art from consideration of the specification and practice of the embodiments disclosed herein.

The embodiments herein have been described in particular detail with respect to several possible embodiments. Those of skill in the art will appreciate that the subject matter may be practiced in other embodiments. The particular naming of the components, capitalization of terms, the attributes, data structures, or any other programming or structural aspect is not mandatory or significant, and the mechanisms that implement various embodiments may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some portions of above description present the features of the embodiments in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

The described embodiments also relate to an apparatus for performing the operations herein. This apparatus may be specially constructed for the various purposes, or it may comprise a computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, unless context dictates otherwise, the computers referred to in the specification may include a single processor or may be architectures employing multiple processor designs for increased computing capability.

In addition, the described embodiments are not described with reference to any particular programming language. It is appreciated that a variety of programming languages may be used to implement the teachings as described herein.

The described embodiments are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the subject matter. Accordingly, the disclosure is intended to be illustrative, but not limiting.

Upon reading this disclosure, those of skill in the art will appreciate still additional alternative structural and functional designs for a system and a process for providing high performance big data computing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A computing system for accelerating large data transfer, the system including:
    a first processor;
    a dimension store coupled to the first processor and storing input data elements, the dimension store comprising a key-value store and a column store, wherein the key-value store stores the input data elements in a key-value data format, and wherein the column store stores the input data elements in a columnar data format;
    a second processor;
    a model data store coupled to the second processor and storing model data related to the input data elements;
    a third processor coupled to the dimension store and the model data store, wherein the third processor is configured to, in response to receiving an analytics query:
        determine that the key-value store can serve a first portion of the analytics query with better performance than the column store, and that the column store can serve a second portion of the analytics query with better performance than the key-value store;
        in response to the determination, selectively retrieve, based on the first portion of the analytics query and second portion of the analytics query, a first portion of the input data elements from the key-value store and a second portion of the input data elements from the column store;
        join the first portion of the input data elements and the second portion of the input data elements to generate a set of input data elements;
        retrieve, based on the analytics query, portions of the model data; and
        generate a set of analytics results based on the set of input data elements and the portions of the model data and store the set of analytics results in an analytics results store.

2. A computing system as in claim 1, wherein the input data elements correspond to geographical data.

3. A computing system as in claim 1, wherein the analytics query is configured to filter, aggregate or group data processed by the third processor.

4. A computing system as in claim 1, wherein the analytics query uses a compressed bitmap index.

5. A computing system as in claim 1, wherein the first processor is further configured to compress or encrypt the portions of the input data elements.

6. A computing system as in claim 1, wherein the third processor is further configured to compress or encrypt results data generated by the third processor.

7. A computing system as in claim 1, wherein the third processor is configured to receive key information from the dimension store and to use the key information to retrieve a subset of analytics results data from the analytics results store.

8. A computing system as in claim 1, wherein the third processor is configured to retrieve, in an encrypted form, a subset of analytics results data from the analytics results store, based on the first portion of the input data elements, the second portion of the input data elements and the portions of the model data.

9. A computing system as in claim 1, wherein the analytics results store is configured to store data using OCDF.

10. A computing system as in claim 1, wherein the column store is configured to maintain the input data elements according to arrays of columns.

11. A computing system as in claim 1, wherein the dimension store is proximate to the third processor.

12. A computing system as in claim 1, wherein the third processor is configured to determine the first and second portions of the input data elements based in part on data currently available in the analytics results store.

13. A computing system as in claim 1, wherein the third processor is configured to define data cubes to determine, responsive to the analytics query, the first portion of the input data elements, the second portion of the input data elements, and the portions of the model data.

14. A computing system as in claim 1, wherein the second processor is configured to create models by combining and integrating functions using a Declarative Computation and Query Language.

15. A computing system as in claim 1, wherein the second processor is configured to invoke functions using a syntax corresponding to SQL.

16. A computing system as in claim 1, further comprising a platform services processor managing data streams to select among available processors to perform a plurality of processing tasks on a subset of data stored in at least one of the dimension store, the model data store and the analytics results store.

17. A computing system as in claim 1, wherein the first processor is configured to transfer the portions of the input data elements in an encrypted form.

18. A method of moving data from first and second portions of a computing system to a third portion of a computing system, comprising:
  receiving an analytics query and, based on the analytics query, generating a characteristic relating to the first and second portions of the computing system;
  determining that the first portion of the computing system can serve a first portion of the analytics query with better performance than the second portion of the computing system, and that the second portion of the computing system can serve a second portion of the analytics query with better performance than the first portion of the computing system;
  in response to the determining, retrieving a first subset of data from the first portion of the computing system and a second subset of data from the second portion of the computing system, wherein the first portion comprises a key-value data store, wherein the second portion comprises a column data store, wherein the key-value data store and the column data store each store input data elements, wherein the key-value data store stores the input data elements in a key-value data format, and wherein the column data store stores input data elements in a columnar data format;
  transferring the first subset of data and the second subset of data from the first and second portions to the third portion based on the query and on the characteristic.

19. The method of claim 18, wherein the characteristic is a compressed bitmap index.

20. The method of claim 18, wherein the first and second portions are compressed and encrypted, further comprising generating the subsets in compressed and encrypted form, and wherein the transferring is of the subsets in the compressed and encrypted form.

* * * * *